United States Patent
Merrick et al.

(10) Patent No.: US 12,138,824 B2
(45) Date of Patent: Nov. 12, 2024

(54) PROCESS FOR MANUFACTURING AND FINISHING IMPROVED ENGINEERED WOOD SIDING

(71) Applicant: LOUISIANA-PACIFIC CORPORATION, Nashville, TN (US)

(72) Inventors: Gareth Paul Merrick, Gig Harbor, WA (US); David L. Stackhouse, North Wiles, NC (US); Tommy R. Wyatt, Millers Creek, NC (US); Eric C. Billings, McGrady, NC (US); Lance Olson, Saginaw, MN (US); David C. Ritter, Nashville, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 237 days.

(21) Appl. No.: 16/780,726

(22) Filed: Feb. 3, 2020

(65) Prior Publication Data

US 2020/0247002 A1 Aug. 6, 2020

Related U.S. Application Data (60) Provisional application No. 62/799,809, filed on Feb. 1, 2019.

(51) Int. Cl.
| | |
|---|---|
| *B27N 3/12* | (2006.01) |
| *B27N 3/04* | (2006.01) |
| *B27N 7/00* | (2006.01) |

(52) U.S. Cl.
CPC ............... *B27N 3/12* (2013.01); *B27N 3/04* (2013.01); *B27N 7/005* (2013.01)

(58) Field of Classification Search
CPC . B27N 3/12; B27N 3/04; B27N 7/005; B27N 3/02; B27N 3/186; B27N 3/20;
(Continued)

(56) References Cited

U.S. PATENT DOCUMENTS

| | | | | | |
|---|---|---|---|---|---|
| 3,008,847 | A | * | 11/1961 | La Berge ............... | C09D 5/002 428/328 |
| 3,294,622 | A | * | 12/1966 | Wark ..................... | B32B 27/00 156/60 |

(Continued)

FOREIGN PATENT DOCUMENTS

EP 3112106 A1 * 1/2017 ............. B27N 1/006

OTHER PUBLICATIONS

International Search Report and Written Opinion, PCT/US20/016438, Louisiana-Pacific Corporation, international filing date Feb. 3, 2020.

(Continued)

*Primary Examiner* — Jacob T Minskey
*Assistant Examiner* — Caroline Beha
(74) *Attorney, Agent, or Firm* — Wayne Edward Ramage; Baker Donelson (57) ABSTRACT

An improved engineered wood product, and related methods, with improved actual and apparent surface quality. The product includes a high basis weight fines layer overlaying a strand matrix base layer, with one or more overlay layers. The fines layer may be placed between the overlay layers, if multiple overlays are present. The configuration of fines layer and overlay layer(s) minimizes the presence of subsurface imperfections that may result in visible telegraphing on the exposed surface. A light pattern or texture may be embossed on the outermost overlay layer during the pressing process. Additionally, a paint primer layer or coating with added aggregate may be applied to help camouflage inherent sub-surface defects.

20 Claims, 7 Drawing Sheets

(58) Field of Classification Search
CPC ..... B27N 3/143; B32B 2255/12; B32B 5/028; B32B 2255/08; B32B 7/02; B32B 21/02; B32B 21/06; B32B 21/14; B32B 29/005; B32B 2250/02; B32B 2255/20; B32B 2255/24; B32B 2255/28; B32B 2307/402; B32B 2307/406; B32B 2307/718; B32B 2607/00

See application file for complete search history.

(56) References Cited

U.S. PATENT DOCUMENTS

| | | | | |
|---|---|---|---|---|
| 3,639,200 | A * | 2/1972 | Elmendorf | B32B 15/06 |
| | | | | 156/154 |
| 4,111,730 | A | 9/1978 | Balatinecz | |
| 4,364,984 | A * | 12/1982 | Wentworth | B32B 21/042 |
| | | | | 428/326 |
| 4,504,207 | A * | 3/1985 | Arnold | B30B 1/32 |
| | | | | 425/385 |
| 5,397,406 | A * | 3/1995 | Vaders | B27M 3/0093 |
| | | | | 264/293 |
| 8,955,281 | B2 | 2/2015 | Pietruczynik et al. | |
| 9,255,405 | B2 * | 2/2016 | Pervan | E04C 2/246 |
| 2001/0049406 | A1 * | 12/2001 | Cox | C08L 101/00 |
| | | | | 524/27 |
| 2003/0035917 | A1 * | 2/2003 | Hyman | B41M 5/36 |
| | | | | 524/106 |
| 2005/0079780 | A1 * | 4/2005 | Rowe | B32B 5/18 |
| | | | | 442/326 |
| 2006/0105161 | A1 | 5/2006 | Brandenburger et al. | |
| 2007/0078191 | A1 * | 4/2007 | Guhde | C08J 9/0066 |
| | | | | 521/99 |
| 2008/0202053 | A1 * | 8/2008 | Guy | E04F 15/02144 |
| | | | | 52/391 |
| 2009/0155612 | A1 * | 6/2009 | Pervan | B32B 21/02 |
| | | | | 428/326 |
| 2010/0139877 | A1 * | 6/2010 | Black | B32B 5/26 |
| | | | | 162/146 |
| 2011/0008399 | A1 * | 1/2011 | Bugnon | C09C 1/0015 |
| | | | | 424/641 |
| 2013/0019778 | A1 | 1/2013 | Moriarty et al. | |
| 2014/0147641 | A1 * | 5/2014 | Vermeulen | E04F 13/18 |
| | | | | 156/244.11 |
| 2014/0370319 | A1 * | 12/2014 | Vetter | E04C 2/16 |
| | | | | 264/173.1 |
| 2018/0126584 | A1 | 5/2018 | Ritter | |
| 2018/0272558 | A1 | 9/2018 | Kalwa | |

OTHER PUBLICATIONS

Official Action (co-pending application), CL 202102012, Louisiana-Pacific Corporation, dated Feb. 15, 2024.
Search Report (co-pending application), CL 202102012, Louisiana-Pacific Corporation, dated May 16, 2023.
Expert Examiner Report (co-pending application), CL 202102012, Louisiana-Pacific Corporation, dated May 16, 2023.
Communication Under Rule 71(3) EPC—Intent to Grant (co-pending application), EP 20748036.9, Louisiana-Pacific Corporation, dated Mar. 27, 2024.
Supplement Search and Opinion (co-pending application), EP 20748036.9, Louisiana-Pacific Corporation, dated Nov. 2, 2022.

* cited by examiner

PROCESS FOR MANUFACTURING AND FINISHING IMPROVED ENGINEERED WOOD SIDING

This application claims benefit of and priority to U.S. Provisional Application No. 62/799,809, filed Feb. 1, 2019. The specification, drawings and complete disclosure of U.S. Provisional Application No. 62/799,809 is incorporated herein by specific reference for all purposes

FIELD OF INVENTION

This invention relates to a system and process for producing an engineered wood based siding, cladding or panel (e.g., manufactured with wood veneer, strands or fibers) with an improved smooth surface appearance.

SUMMARY OF INVENTION

In various embodiments, the present invention comprises an improved engineered wood product, along with several techniques and methods that, used separately or in combination, improve the actual and apparent surface quality of the improved engineered wood product. It includes manufacturing techniques to minimize the presence of sub-surface imperfections that may result in visible telegraphing on the exposed surface. In several embodiments, it also uses light diffraction through applied pixilation and a minimally textured finish to help camouflage inherent sub-surface defects. In additional embodiments, it includes the use of certain colors and paint gloss combinations. The synergistic combination of two or more of these methods significantly improve the actual and apparent surface quality and appearance.

In one exemplary embodiment, the manufacturing process is modified to comprise the addition of a "fines" surface layer (e.g., wood flour) to the mat prior to pressing. The fines layer is increased in basis weight over prior art layers. This higher basis weight fines layer helps hide telegraphing even where no deep or aggressive embossed texture is applied. The fines may be deposited in one layer or more than one layer and may be on, under or between various overlay layers. Further, the fines may be deposited in discreet particle form or may be pre-formed into a loosely bound mat that can be suitably conveyed in the manufacturing process.

One or more layers of an engineered, cellulose or non-cellulose (e.g. paper) based overlay (applied to the surface over, under, or between the fines layer) may also be added. In one embodiment, a medium basis weight paper overlay is combined with a second equal or higher basis weight paper overlay over a higher basis weight fines layer. This combination provides improved surface appearance, even with no or minimal embossing. In another embodiment, the fines are deposited between two overlays with the underlayer being a non-cellulose overlay and the top (over) layer being a cellulose-based overlay.

Smooth caul plates, having no texture/embossing, do not effectively hide subsurface defects that telegraph onto the surface, such as the outline of the wood element (e.g., strands) used to manufacture the engineered wood composite. In addition, smooth caul plates inherently produce smooth, glossy spots on the surface product, which is attributed to process heat, impregnated paper-based overlay, and variations in the underlying density. Such smooth, glossy spots cannot be totally eliminated merely by adjusting the fines layer basis weight (as discussed above), and cannot be totally hidden by using common paint finishes (e.g., exterior latex paint).

In several embodiments, the present invention uses caul plates with light embossing/texturing, which impart a minimal embossing/texture to the surface (i.e. the caul plates transfer an inverse image of the texture to the product surface). The caul plate embossing pattern can take a variety of forms, from minimal to aggressive. In one embodiment, the light embossing comprises a series of small dots and dashes. This low level of embossment maintains the appearance of a smooth product surface when viewed from a normal distance but interrupts the light across the surface and camouflages any minor imperfections, such as glossy spots or a wood element outline.

In additional embodiments, an aggregate-containing paint primer or film coating may be applied. The aggregate may be a fine mineral or non-mineral based material, which provides additional light diffraction and pixilation of the surface, which further minimizes the appearance of minor surface imperfections. It may be pre-applied to (e.g., incorporated onto) the overlay, or may be applied to the product as a final finishing step after pressing. In further embodiments, the aggregate may be added to final paint or other coatings. Use of certain colors and paint gloss combinations of such coatings will further minimize the appearance of imperfections, while still providing the appearance of being smooth when viewed from a typical distance.

DETAILED DESCRIPTION OF EXEMPLARY EMBODIMENTS

In various exemplary embodiments, the present invention comprises a method or process for producing an engineered wood based siding, cladding or panel (e.g., manufactured with wood veneer, strands or fibers) with an improved surface appearance. More particularly, imperfections in the surface are treated and/or hidden to provide the appearance of being smooth when viewed from typical viewing distances even under critical light conditions.

Engineered wood products, including, but not limited to, oriented-strand board (OSB), fiberboard, laminated strand lumber (LSL), plywood, or laminated veneer lumber (LVL). typically are produced by various primary (and sometimes secondary) pressing processes. Examples of such processes are in U.S. Pat. Nos. 6,461,743; 5,718,786; 5,525,394; 5,470,631; and 5,425,976; and U.S. patent application Ser. No. 15/803,771 (U.S. Pub. No. 20180126584); all of which are incorporated herein in their entireties by specific reference for all purposes.

The nature of the engineered wood manufacturing process results in inherent sub-surface and surface defects or imperfections. Sub-surface defects often result in visible defects or imperfections on the surface (commonly referred to as "telegraphing"). Deeply or aggressively embossed or textured surfaces often can distract the eye from noticing these imperfections, but smooth (non-embossed or minimally embossed) surfaces are more susceptible to having this telegraphing become noticeable, especially under critical light conditions. This is a particular problem with engineered wood based smooth surface siding or cladding when installed on a building, where varying light conditions and viewing angles make undesirable surface imperfections noticeable.

As seen in FIGS. 1-7, present invention comprises an improved engineered wood product, along with several techniques and methods that, used separately or in combination, improve the actual and apparent surface quality of the improved engineered wood product. It includes manufacturing techniques to minimize the presence of sub-surface imperfections that may result in visible telegraphing on the exposed surface. In several embodiments, it also uses light diffraction through applied pixilation and a minimally textured finish to help camouflage inherent sub-surface defects. In additional embodiments, it includes the use of certain colors and paint gloss combinations. The synergistic combination of two or more of these methods significantly improve the actual and apparent surface quality and appearance.

Figure 1:
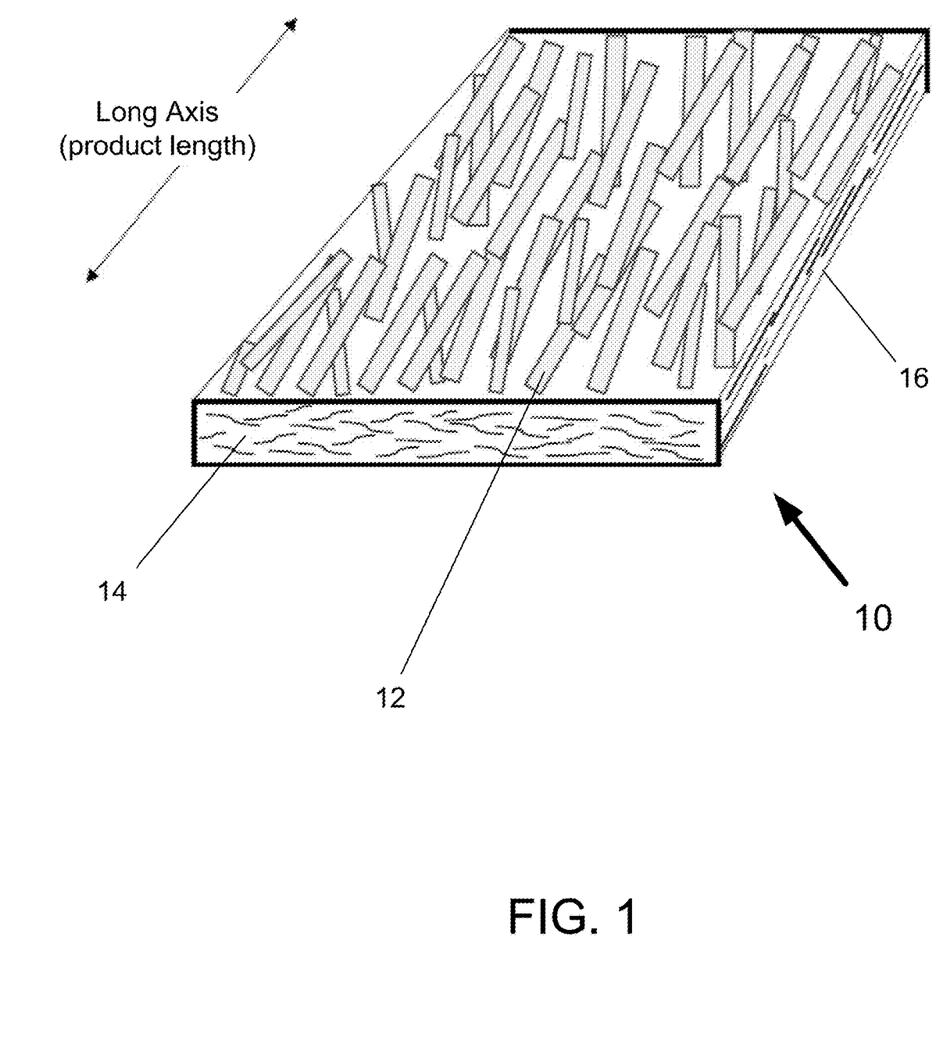
FIG. 1 shows a perspective view of a manufactured wood product base layer with strand orientation.

FIG. 1 shows an example of a section (thickness not to scale) of a base mat or layer 10 for lap siding, with end 14 and side 16 edges, shown with the upper surface exposed. The base layer comprises a matrix of wood strands 12 in a particular orientation (in this case, oriented with respect to the long axis of the product).

Figure 2:
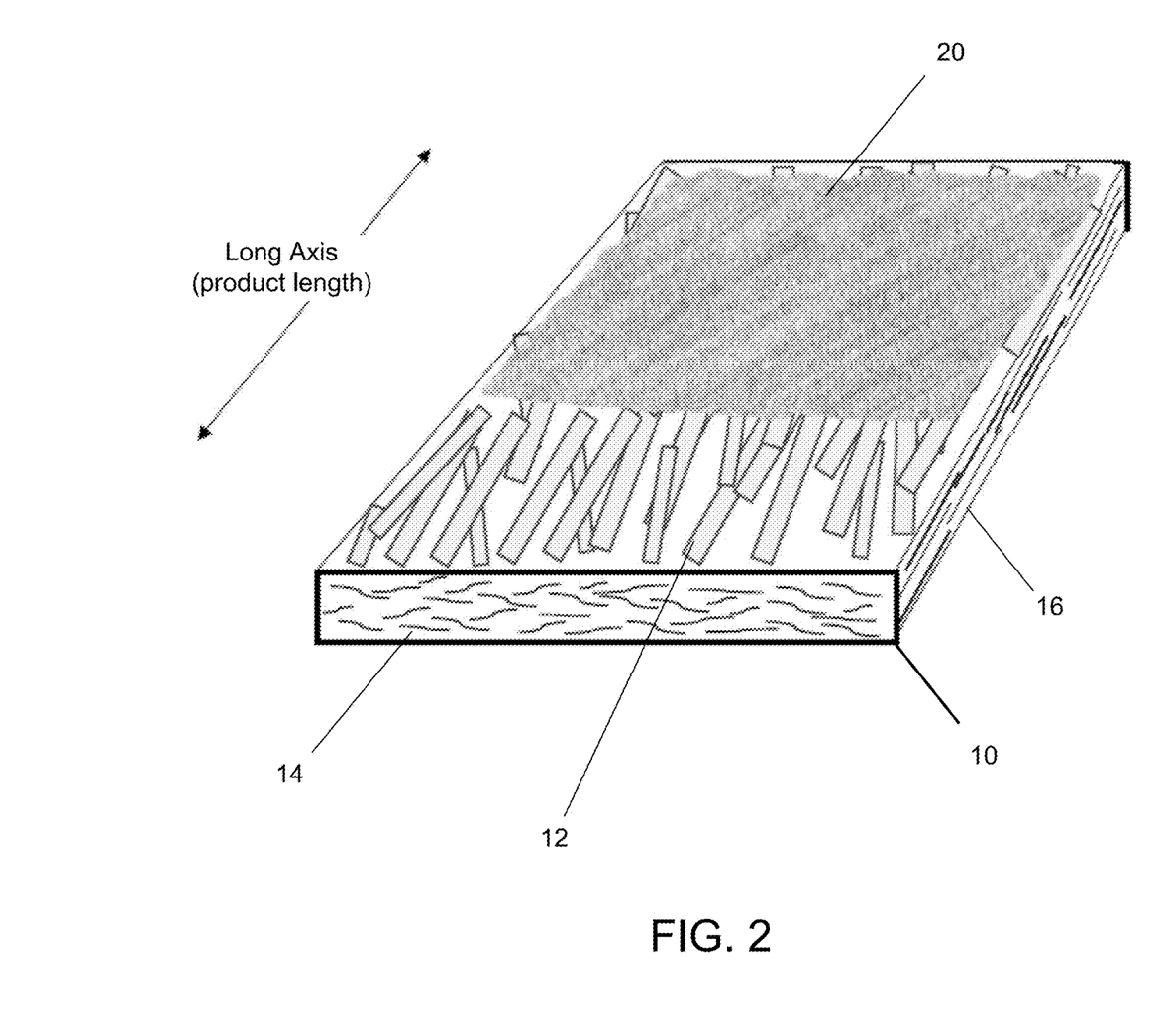
FIG. 2 shows FIG. 1 with the addition of a fines layer (shown partially).

In one exemplary embodiment, the manufacturing process is modified to comprise the addition of a "fines" surface layer (e.g., wood flour) to the mat prior to pressing. FIG. 2 shows the section of FIG. 1 with a fines layer 20 added over the upper surface of the base layer 10. While FIG. 2 shows the fines layer 20 as partially covering the base layer for illustration purposes, the fines layer covers all or substantially all of the upper surface of the base layer 10.

The fines layer 20 is increased in basis weight over similar prior art layers. This higher basis weight fines layer helps hide telegraphing even where no deep or aggressive embossed texture is applied. The fines may be deposited in one layer or more than one layer and may be on, under or between various overlay layers, as described below. Further, the fines may be deposited in discreet particle form or may be pre-formed into a loosely bound mat that can be suitably conveyed in the manufacturing process.

In some exemplary embodiments, the fines (wood flour) layer basis weight can range from about 30 to about 500 pounds per thousand square feet, more preferably from about 200 pounds to about 300 pounds per thousand square feet. In several embodiments, the fines layer basis weight is at least around 225 pounds per thousand square feet or greater. In additional embodiments, the fines layer basis weight is an average of approximately 230 pounds per thousand square feet or greater.

Figure 3:
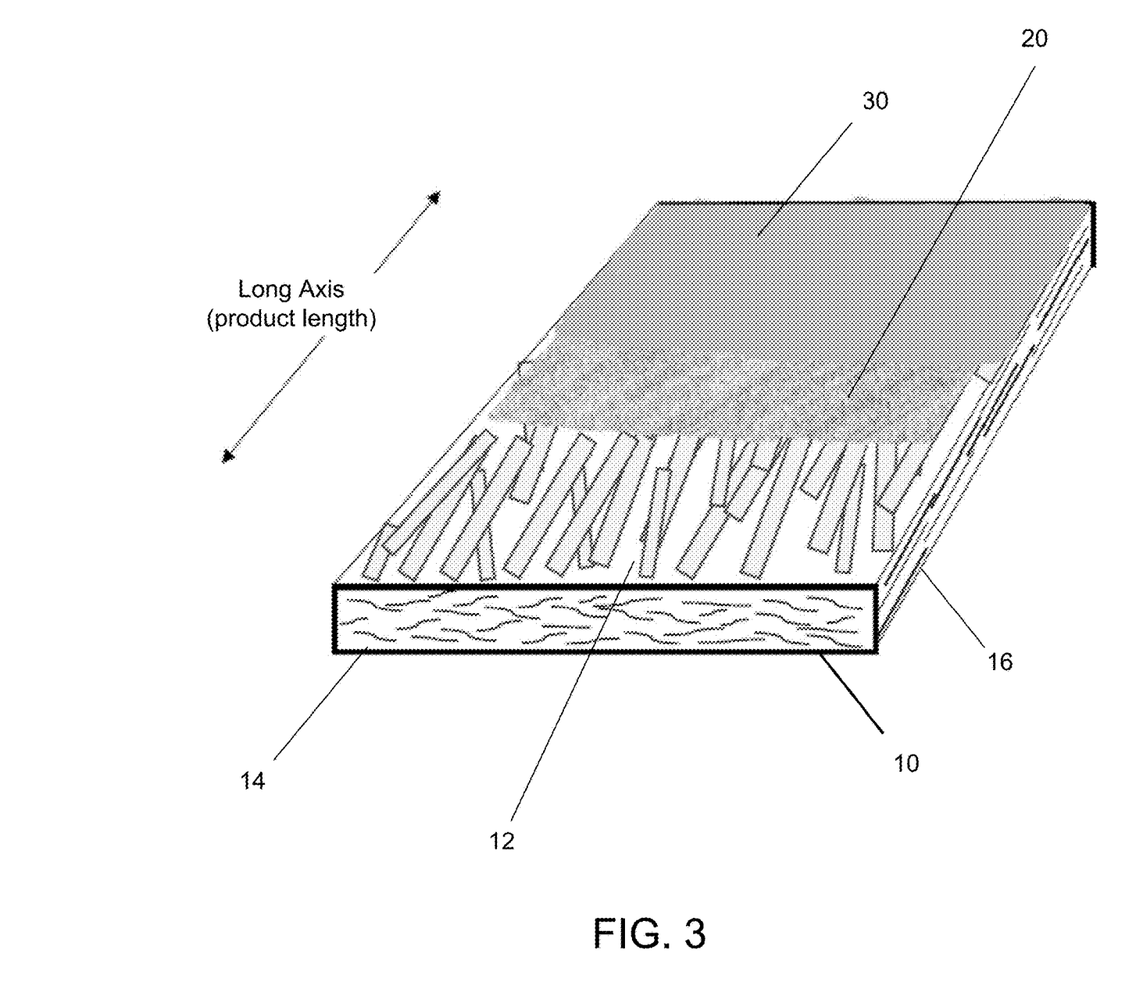
FIG. 3 shows FIG. 2 with the addition of a performance (e.g., paper) overlay (shown partially).

As seen in FIG. 3, one or more layers of an engineered, cellulose or non-cellulose (e.g. paper) based overlay 30 (applied to the surface over, under, or between the fines layer or layers) may also be added. While FIG. 3 shows the overlay layer 30 and fines layer 20 as partially covering the base layer (and intervening layers) for illustration purposes, each successive layer covers all or substantially all of the upper surface of the preceding layer(s).

Figure 6:
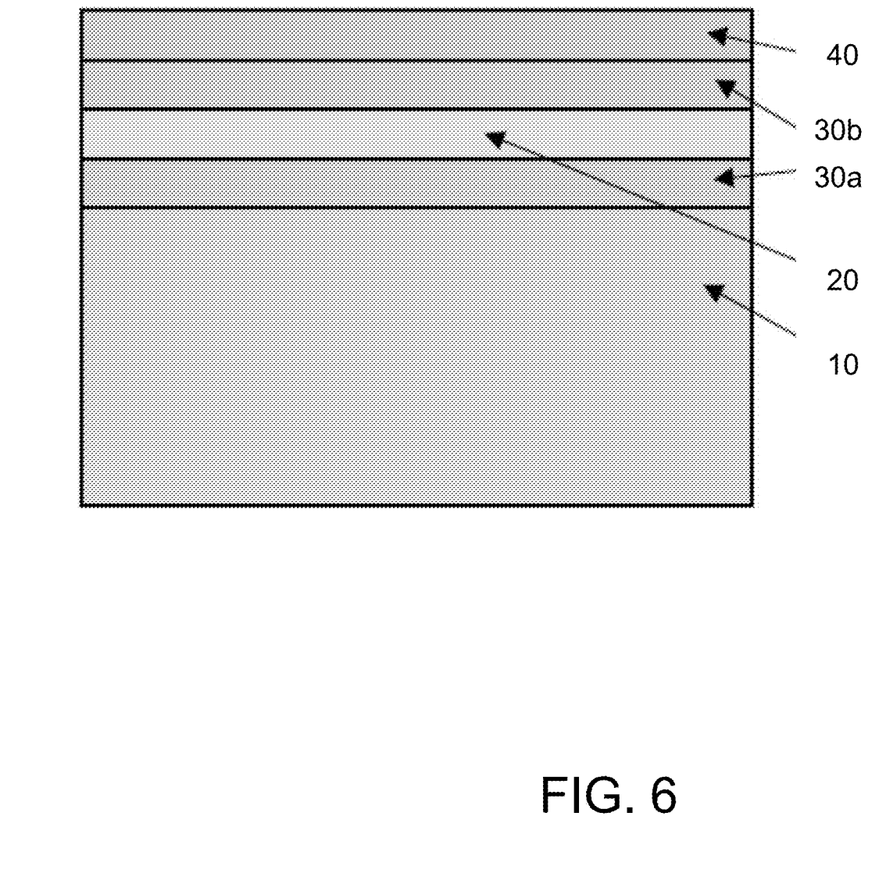
FIG. 6 shows an alternative partial cross-section (expanded) of the product of FIG. 4.

In one embodiment, a medium basis weight paper overlay is combined with a second equal or higher basis weight paper overlay over a higher basis weight fines layer. This combination of two paper overlay layers 30 covering a fines layer 20 provides improved surface appearance, even with no or minimal embossing. In another embodiment, as seen in FIG. 6, the fines layer 20 is deposited between two overlay layers 30a, b with the under (or lower) layer 30a being a non-cellulose overlay and the top (or over) 30 b layer being a cellulose-based overlay.

In one exemplary embodiment, the paper overlay comprises around 50 to 70 lb. paper (industry standard weight, typically based on a 3000 sq. ft. basis, with the weight being+/−5%). In one embodiment with two overlays, the outside facing layer comprises 70 lb. paper, while the inner overlay comprises a 50 lb. overlay (or "cushion sheet").

The mat comprising the above layers 10, 20, 30 in various combinations is then subjected to heat and pressure in a press with caul plates to form the engineered wood product. Smooth caul plates, having no texture or embossing, do not effectively hide subsurface defects that telegraph onto the surface, such as the outline of the wood element (e.g., strands) used to manufacture the engineered wood composite. In addition, smooth caul plates inherently produce smooth, glossy spots on the surface product. These are attributed to process heat, impregnated paper-based overlay (s), and variations in the underlying layer density. Such smooth, glossy spots cannot be totally eliminated merely by adjusting the fines layer basis weight (as discussed above), and cannot be totally hidden by using common paint finishes (e.g., exterior latex paint).

In several embodiments, the present invention uses caul plates with light embossing or texturing, which impart a minimal embossing, texture or pattern to the upper surface of the outermost layer of the product (i.e., the caul plates transfer an inverse image of the texture to the product surface). The caul plate embossing or texture pattern can take a variety of forms, from minimal (or light or shallow) to aggressive (or heavy or deep). In one embodiment, the light or minimal embossing comprises a series of small dots and dashes, which may be formed in lines or rows, or randomly placed. This low level of embossment maintains the appearance of a smooth product surface when viewed from a normal distance but interrupts the light across the surface and camouflages any minor imperfections, such as glossy spots or a wood element (e.g., strand) outline.

Figure 4:
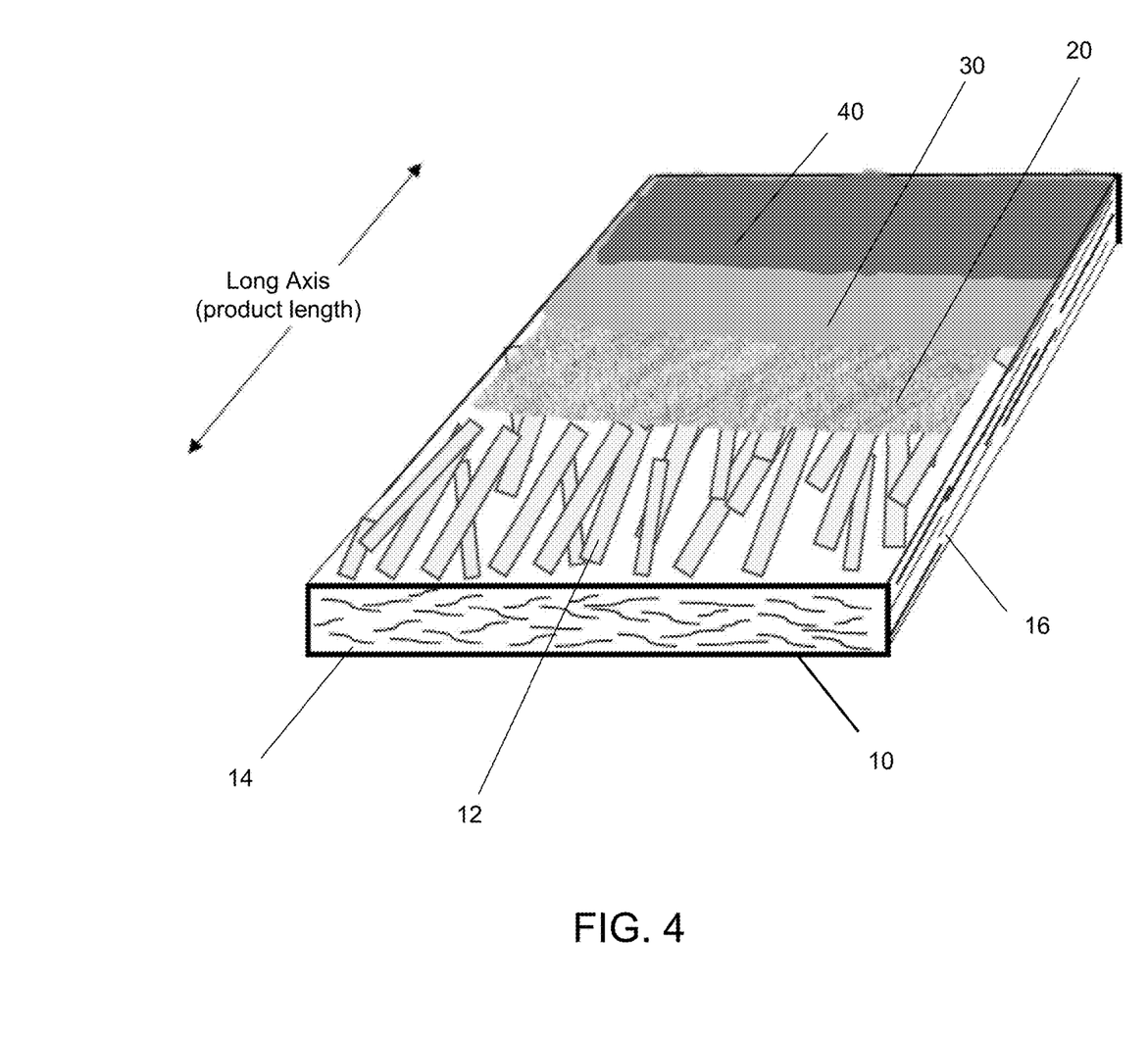
FIG. 4 shows FIG. 3 with the addition of a paint primer with functional additives (e.g., aggregate) (shown partially).
Figure 5:
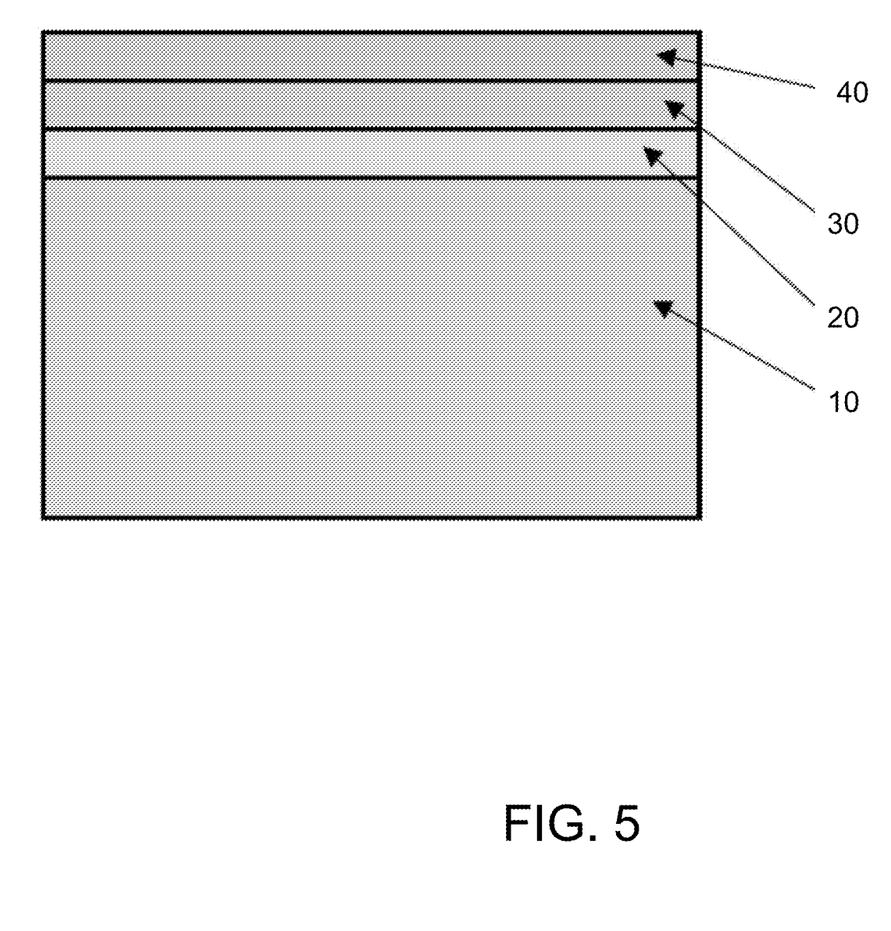
FIG. 5 shows a partial cross-section (expanded) of the product of FIG. 4.
Figure 7:
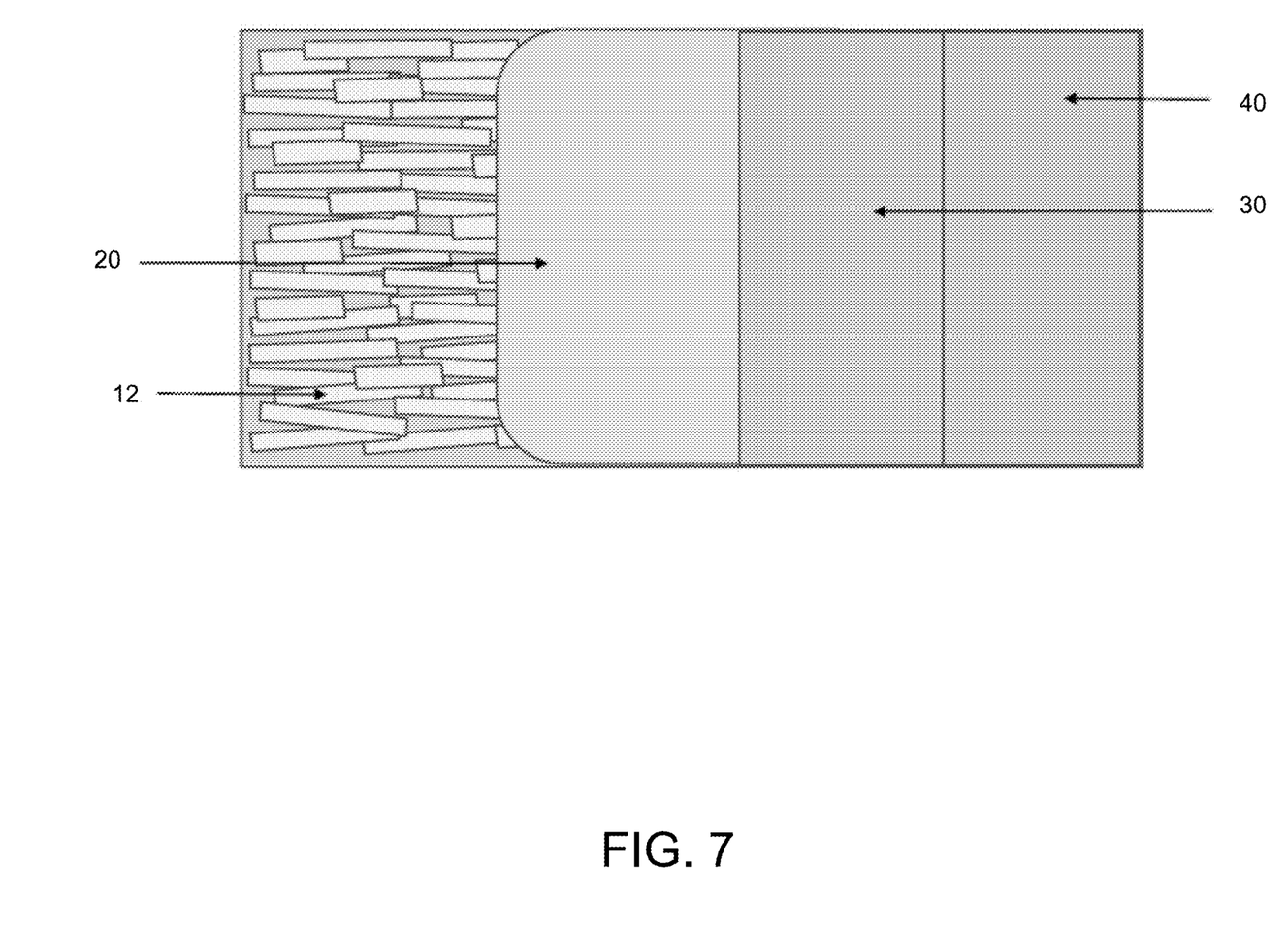
FIG. 7 shows a top view of FIG. 4.

In additional embodiments, an aggregate-containing paint primer or film coating 40 may be applied, as seen in FIGS. 4, 5 and 7 (note that relative thickness of the layers in FIG. 5 is not to scale). The primer or film coating layer 40 may be applied in the factory, during the manufacturing process or post-manufacturing. The aggregate may be a fine mineral or non-mineral based material, which provides additional light diffraction and pixilation of the surface, which further minimizes the appearance of minor surface imperfections. It may be pre-applied to (e.g., incorporated onto) the overlay, or may be applied to the product as a final finishing step after pressing. While FIGS. 4 and 7 shows the paint primer layer 40, overlay layer 30 and fines layer 20 as partially covering the base layer (and intervening layers) for illustration purposes, each successive layer covers all or substantially all of the upper surface of the preceding layer(s). As discussed above, FIG. 6 show an alternative embodiment where a first overlay layer 30a is applied to the top of the base layer 10, below the fines layer 20, with a second overlay layer 30b applied over the fines layer.

In further embodiments, the aggregate may be added to the final paint application or other final coatings. Use of certain colors and paint gloss combinations of such coatings will further minimize the appearance of imperfections, while still providing the appearance of being smooth when viewed from a typical distance.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. . A manufacturing process for producing a strand-based product, comprising the steps of:
   blending cellulosic strands with one or more additives or chemicals;
   forming a base mat from said cellulosic strands, said base comprising at least a bottom layer of cellulosic strands, a core layer of cellulosic strands, and a top layer of cellulosic strands;
   applying one or more layers on the top layer of the base mat, said one or more layers comprising
      a fines layer, said fines comprising wood particles smaller in size than the cellulosic strands and separate from the core layer, wherein the fines layer has a basis weight from about 225 pounds per thousand square feet to about 300 pounds per thousand square feet;
      a first overlay layer; and
      a second overlay layer;
   applying heat and pressure to the base mat, the first overlay layer, and the second overlay layer in a pressing process to form a board, wherein the pressing process comprises application of a plate to produce an embossment on the upper surface of the board; and
   applying, in a factory during a manufacturing process, a paint primer layer to the embossed upper surface of the board, wherein the paint primer contains a fine aggregate adapted to provide light diffraction of the embossed upper surface.

2. The process of claim 1, wherein the fines layer comprises wood flour.

3. The process of claim 1, wherein said at least one overlay layer comprises a cellulose-based overlay layer.

4. The process of claim 1, wherein said at least one overlay layer comprises two overlay layers, a first overlay layer comprising a non-cellulose-based overlay layer, and a second overlay layer comprising a cellulose-based overlay layer.

5. The process of claim 4, wherein the fines layer is disposed between the first overlay layer and the second overlay layer.

6. The process of claim 4, wherein the fines layer is disposed under the first overlay layer and the second overlay layer.

7. The process of claim 4, wherein the first overlay layer and the second overlay layer have identical basis weights.

8. The process of claim 4, wherein the first overlay layer has a basis weight lower than a basis weight of the second overlay layer.

9. The process of claim 1, wherein the fines layer is disposed adjacent to the base mat, and the at least one overlay layer is disposed adjacent to the fines layer opposite the base mat.

10. The process of claim 1, wherein the embossment comprises a series of small dots and dashes, configured to camouflage imperfections in the surface of the board.

11. The process of claim 1, wherein the aggregate comprises fine mineral material.

12. A manufactured strand-based wood product produced by the method of claim 1.

13. The process of claim 1, wherein the fines layer has a basis weight from about 30 pounds per thousand square feet to about 500 pounds per thousand square feet.

14. The process of claim 1, wherein the fines layer has a basis weight from about 200 pounds per thousand square feet to about 300 pounds per thousand square feet.

15. . The process of claim 1, wherein the fines layer has a basis weight of at least 225 pounds per thousand square feet.

16. The process of claim 1, wherein the fines wood particles are applied in discrete particle form.

17. The process of claim 1, wherein the fines wood particles are applied as a pre-formed mat.

18. The process of claim 1, wherein the fines wood particles comprise wood particles of various sizes having a width and thickness less than the average width and thickness of the cellulosic strands in the base mat.

19. The process of claim 1, wherein the fines wood particles comprise wood particles of various sizes having a width and thickness less than the average width and thickness of the cellulosic strands in the base mat.

20. The process of claim 1, wherein the fines wood particles comprise wood particles having a width and thickness less than 0.50 mm.

* * * * *